United States Patent [19]

Terai

[11] Patent Number: 5,287,622
[45] Date of Patent: Feb. 22, 1994

[54] METHOD FOR PREPARATION OF A SUBSTRATE FOR A HEAT-GENERATING DEVICE, METHOD FOR PREPARATION OF A HEAT-GENERATING SUBSTRATE, AND METHOD FOR PREPARATION OF AN INK JET RECORDING HEAD

[75] Inventor: Haruhiko Terai, Yokohama, Japan

[73] Assignee: Canon Kabushiki Kaisha, Tokyo, Japan

[21] Appl. No.: 938,525

[22] Filed: Sep. 2, 1992

Related U.S. Application Data

[63] Continuation of Ser. No. 477,169, Feb. 8, 1990, abandoned, which is a continuation of Ser. No. 132,894, Dec. 14, 1987, abandoned.

[30] Foreign Application Priority Data

Dec. 17, 1986 [JP]  Japan ............................... 61-298885

[51] Int. Cl.$^5$ .............................................. B32B 31/26
[52] U.S. Cl. ................... 29/890.1; 156/272.2; 156/272.8; 219/121.17; 219/121.66
[58] Field of Search ................ 346/140 R; 156/272.2, 156/272.8; 219/121.16, 121.17, 121.65, 121.66; 29/890.1

[56] References Cited

U.S. PATENT DOCUMENTS

| | | | |
|---|---|---|---|
| 4,218,494 | 8/1980 | Belmondo et al. | 219/121.66 |
| 4,243,867 | 1/1981 | Earle et al. | 219/121.65 |
| 4,313,124 | 1/1982 | Hara | 346/140 R |
| 4,322,601 | 3/1982 | Serlin | 219/121.65 |
| 4,336,548 | 6/1982 | Matsumoto | 346/140 |
| 4,457,972 | 7/1984 | Griffith et al. | 156/272.2 |
| 4,458,256 | 7/1984 | Shirato et al. | 346/140 R |
| 4,496,607 | 1/1985 | Mathias | 427/53.1 |
| 4,596,994 | 6/1986 | Matsuda et al. | 346/140 R |
| 4,663,640 | 5/1987 | Ikeda | 346/140 R |
| 4,675,065 | 6/1987 | Gordon | 156/272.8 |
| 4,710,253 | 12/1987 | Soszek | 156/273.7 |
| 4,723,129 | 2/1988 | Endo et al. | 346/1.1 |
| 4,725,859 | 2/1988 | Shibata et al. | 346/140 R |
| 4,738,602 | 4/1988 | Yamamoto et al. | 29/557 |

Primary Examiner—Allan R. Kuhns
Attorney, Agent, or Firm—Fitzpatrick, Cella, Harper & Scinto

[57] ABSTRACT

Method for preparing a substrate for a heat generating device, such a heat generating substrate and an ink jet recording head having such substrate, includes the steps of irradiating a high density energy stream on the surface of a base material on which is provided a material capable of forming an insulating layer by heating, and forming a layer having insulating properties on the surface of said base material while melting the material by heating.

25 Claims, 3 Drawing Sheets

METHOD FOR PREPARATION OF A SUBSTRATE FOR A HEAT-GENERATING DEVICE, METHOD FOR PREPARATION OF A HEAT-GENERATING SUBSTRATE, AND METHOD FOR PREPARATION OF AN INK JET RECORDING HEAD

This application is a continuation of application Ser. No. 07/477,169 filed Feb. 8, 1990, now abandoned, which in turn is a continuation of application Ser. No. 07/132,894 filed Dec. 14, 1987, now abandoned.

BACKGROUND OF THE INVENTION

1. Field of the Invention

This invention relates to a method for preparing a substrate for a heat-generating device, which is suitable for providing a heat generating element required to repeat an intermittently heated state and non-heated state in extremely short cycles, such as an ink jet recording head or thermal head, and a method for preparing a heat-generating substrate having said heat-generating device and also a method for preparing an ink jet recording head.

2. Related Background Art

As the heat-generating device for various instruments such as ink jet recording heads or thermal heads, there have been widely used those having heat-generating resistance layers comprising various metals, alloys or inorganic compounds which generate heat by current passage and electrodes connected electrically to said heat-generating layers, all provided on a substrate.

As the substrate for arranging the heat-generating device thereon, there have been employed in the art those having insulating layers provided on a metallic base material, for the advantages of high heat dissipating characteristic, easy workability and low cost.

As such substrate, there have been known, for example, enamel substrates having enamel layers provided on metallic base materials, Alumite substrates having aluminum oxide coating provided on the surface according to an anodic oxidation method, organic film coating substrates having a film comprising an insulating organic compound coated on the metal surface, vapor deposition substrates having inorganic insulating material vapor deposited on the metal surface, or those with a constitution having two or more of these techniques combined.

Also, as a substrate using no metallic material, an Si substrate having a thermally oxidized product film thereon or an alumina substrate prepared by sintering alumina powder has been known.

Whereas, for the substrate for providing a heat-generating device required to repeat intermittently a heated state and a non-heated state in extremely short cycles, such as an jet recording head or thermal head, for example, various characteristics as shown below have been demanded.

a) To have a surface state such as surface roughness, etc. adequate for the formation of a heat generating device with good precision (for example, when the surface roughness approaches the thickness of the heat-generating device, desired resistance value cannot be obtained in some cases).

b) To have adequate heat-dissipating characteristics (for example, in the case of a substrate to be used for an ink jet recording head, if the substrate temperature becomes too high, bubbles are generated through lowering the solubility of dissolved gas in the ink within the head, which will hamper discharging ability in a thermal head, if heat-dissipating characteristics are bad, the so-called tailing phenomenon may occur).

c) To have heat-resistance to the extent sufficient to withstand the peak temperature of the heat-generating device.

d) To have insulating properties sufficient to withstand the driving voltage of the heat-generating device.

e) To be capable of easily forming a large device, when used for an instrument which is required to be made on a large scale.

f) When liquid such as ink, etc. or various materials to be in contact with the substrate or there is such possibility, to have resistance, for example, acid resistance or alkali resistance, to these.

Further, these characteristics are desirably obtained with low cost and high reliability.

However, no substrate satisfying sufficiently all of the above requisite characteristics has been found in the prior art.

For example, an enamel substrate can have formed thereon an enamel layer (which is an insulating layer) by coating a glassy material on the substrate surface by dipping, and therefore it is difficult to make the insulating layer thinner than a certain thickness, whereby good heat dissipating characteristics cannot be obtained.

On the other hand, in the case of an Alumite substrate, when aluminum oxide which becomes an insulating layer is coated by an anodic oxidation method, the aluminum oxide formed undergoes columnar crystal growth in the vertical direction relative to the substrate, whereby many voids may be sometimes formed so as to exhibit adequate heat dissipating characteristics. There was also a problem that the surface roughness after such anodic oxidation was too great. In order to obviate these problems, there may be used methods of applying sealing treatments and surface polishing, but these can cause new problems in that the number manufacturing steps becomes too large.

In Organic substrates, there was the problem that heat resistance was inferior.

Further, with vapor deposited substrates, defects such as pinholes in the vapor deposited layer are liable to be generated, and also good adhesiveness of the insulating layer to the substrate may not be obtained, whereby peel-off of the insulating layer may sometimes occur after prolonged usage. Thus, reliability was lacking, and also the preparation device was expensive, since a long time for preparation was required, whereby the results were not necessarily satisfactory in the aspect of cost.

Also, in substrates using metals as the base material, for formation of a good insulating layer on the base material, the surface must be subjected to mirror surface working by polishing, lapping, polish finishing, etc., and for this reason, the number of manufacturing steps is basically large, which was an obstacle against reduction in cost.

An alumina substrate can be prepared by sintering Al powder, with its surface being porous in nature, so that further lowering of surface roughness by surface polishing is limited, whereby it is required for obtaining preferable characteristic to apply further treatment such as a coating of a glaze layer. However, application of such treatment not only resulted in an increased number of steps, but there ensued sometimes the problem that heat dissipation was lowered.

On the other hand, an Si substrate having a thermally oxidized film, can satisfy the characteristics a)–d) and f) as described above, and therefore is more desirable in the aspect of performance from among the substrates of the prior art as described above. However, a problem remained in preparation of a substrate with a large area, and also working steps such as surface polishing, etc, are further required, and therefore there still remained room for further improvement also in the aspect of production cost.

SUMMARY OF THE INVENTION

An object of the present invention is to provide a method for preparing a substrate for a heat-generating device which can satisfy all of the requisite characteristics as described above, and a method for preparing a heat-generating substrate and a method for preparing an ink jet recording head.

Another object of the present invention is to provide a method for preparing a substrate for a heat-generating device, comprising the steps of irradiating a high density energy stream on the surface of a base material on which a material capable of forming an insulating layer by heating exists, and forming a layer having insulating property on said substrate surface while melting said material by heating.

Still another object of the present invention is to provide a method for preparing a heat-generating substrate, comprising:

the step of irradiating a high density energy stream on the surface of a base material on which a material capable of forming an insulating layer by heating exists, and forming a layer having insulating properties on said substrate surface while melting said material by heating, thereby forming a substrate having said base material and said insulating layer, and the step of forming a heat-generating device on said substrate.

A further object of the present invention is to provide a metal for preparing an ink jet recording head having liquid pathways in grooves formed by providing a ceiling plate having said grooves on a substrate, comprising:

the step of forming said substrate by including the process of irradiating a high density energy stream on the surface of a base material on which a material capable of forming an insulating layer by heating exists, and forming a layer having insulating properties on said substrate surface while melting said material by heating, and the step of forming said liquid pathways on said substrate.

DESCRIPTION OF THE PREFERRED EMBODIMENTS

Figure 1:
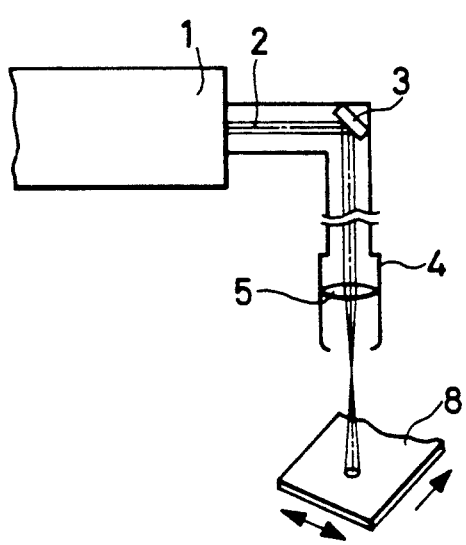
FIG. 1 and FIG. 2 are schematic illustrations showing an example of the laser beam irradiation method which can be used in the method of the present invention.

The preparation method of the present invention is to form an insulating material by heating and melting only the local portion of the base material surface within an extremely short time by irradiation of a high density energy stream onto the base material surface. The insulating material formed during this process enters as liquid state, and therefore it is possible to obtain extremely preferably surface properties when it has solidified. Also, since the insulating layer formed will not become porous, its heat dissipating characteristics will not be lowered even when it may be formed to a thickness which can give sufficient insulating property. Further, since the high density energy stream irradiated locally can be controlled easily, it becomes possible to form a uniform insulating layer over a large area.

The material capable of forming an insulating layer by heating as mentioned in the present invention refers to a material capable of forming an insulating layer through a heating procedure, including, for example, combinations of starting materials capable of forming layers comprising compounds having insulating properties through eating and melting accompanied with the reaction, and materials capable of forming insulating layers through solidification through heating and melting, although not accompanied with the reaction.

Specific examples of the above materials to be used on the base material surface are enumerated below.

i) A material such as Al-, Ti- or Mg-powder capable of forming an insulating layer comprising oxides thereof obtained by oxidation under a molten state and solidification by cooling is combined with a material necessary for oxidation of said material such as oxygen, etc. and permitted to exist on the base material surface.

ii) A material such as Al- or Ti-powder capable of forming an insulating layer comprising nitrides thereof obtaining by nitrification under a molten state and solidification by cooling is combined with a material necessary for nitrification and permitted to exist on the base material surface.

iii) An insulating material capable of forming an insulating layer by melting such as $Al_2O_3$, $Si_3N_4$, SiC, etc. is permitted to exist on the base material surface.

If desired, two or more of the above i) to iii) can be used in combination. Also, among the above metals, aluminum is particularly suitable because the oxides and nitrides are stable and it is low in cost.

The method of the present invention comprises forming a layer having insulating properties by heating such material permitted to exist on the base material surface on which an insulating layer is to be formed by irradiating said surface with a high density energy stream.

As the base material to be used in the present invention, various materials such as metals, ceramics, Si, etc.

can be used as desired, but those comprising metals such as Al, Cu, Fe, etc. are suitable in satisfying the requisite characteristics as described above.

Said base materials may also comprise the material itself capable of forming the insulating layer as previously mentioned.

The high density energy stream to be used in the method of the present invention may be an energy stream having an intensity to the extent such that it can be irradiated onto the material as described above to heat said material to a temperature sufficient for melting and forming an insulating layer, and examples of such energy streams may include a laser beam, electron beam, TIG (tungsten inert gas) arc, condensed halogen lamp light, etc. Above all, the laser beam condensed to a power density of about $10^5$ W/cm$^2$ can heat the above material rapidly up to sufficient melting temperature, and also can be controlled easily without vaporizing the material by over-heating to generate holes, etc., and is thus preferable.

Referring now to the drawings, the method of the present invention in the case of using laser beam is described below.

Figure 2:
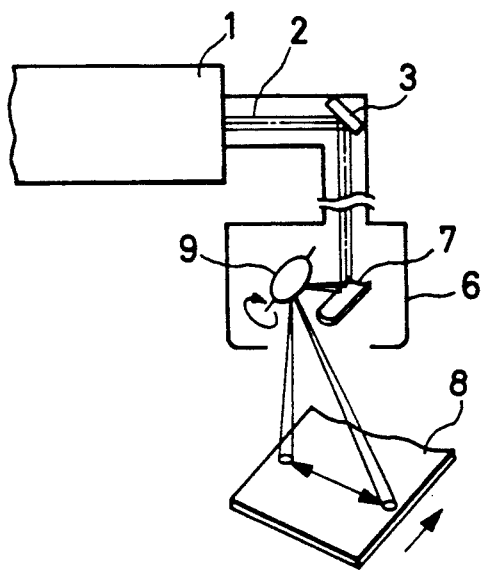

FIG. 1 and FIG. 2 are schematic illustrations showing the outline of the method of a typical laser beam irradiation method to be used in the present invention.

According to the method of FIG. 1, the laser beam 2 outputted from the laser oscillator 1 is led by the mirror 3 to the condensing optical system 4, where it is condensed by the lens built therein and irradiated onto the base material 8 with predetermined intensity and spot diameter.

According to the method shown in FIG. 2, the laser beam 2 outputted from the laser oscillator 1 is led by the mirror 3 to the condensing rocking optical system 6, wherein it is irradiated onto the surface of the base material 8 while being scanned by the concave mirror 7 and the scanning mirror 9 built therein with predetermined intensity and spot diameter.

For obtaining a desired treated surface by moving the laser spot on the surface of the base material 8, the base material 8 and/or the optical systems 4, 6 may be moved.

The method shown in FIG. 1 is simple and convenient in the constitution of the device, but with respect to uniformity in irradiated energy density and the size of irradiation width, the method of FIG. 2 is more convenient.

The constitution of the irradiated surface of the base material on which layer beam is irradiated may be suitably selected depending on the kind of the insulating layer to be formed, by using, for example, the constitution as described above.

Figure 3A:
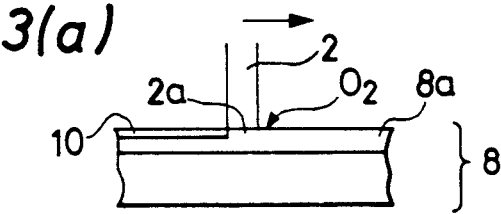
FIG. 3(a) through FIG. 3(c) are schematic illustrations showing constitutional examples of typical base material surfaces and operations in the method of the present invention.
Figure 3B:
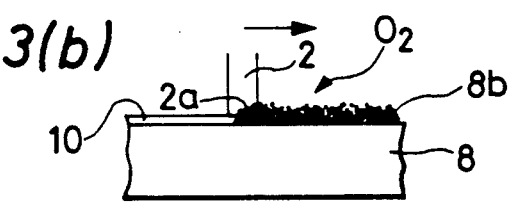
Figure 3C:
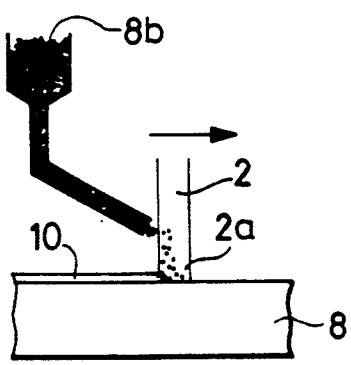

FIG. 3(a)–FIG. 3(c) show typical constitutional examples of the base material surfaces and operations in the method of the present invention.

FIG. 3(a) shows an example of the above i). In this example, a base material having a surface layer 8a comprising a metal the oxide of which is capable of forming a layer having insulating properties. For example, by irradiation of a laser beam on its surface while supplying oxygen in the air or by means of a nozzle to have the metal at the irradiated portion 2a oxidized while being melted, followed by cooling solidification thereof to form an insulating layer, and further this operation is repeated continuously in the moving direction (the arrowhead) of the beam, whereby an insulating layer 11 with a desired area is obtained. The base material 8 may be also formed wholly of a metal which constitutes the surface layer.

FIG. 3(b) is another example of the above i), and powder 8b of as metal of which oxide is capable of forming a layer having insulating property is supplied onto the base material. Laser beam 2 is irradiated there, and after the metal powder 8b is oxidized while being melted, it is solidified by cooling to form the insulating layer 10. In this case, by use of the same constitution as in FIG. 3(a) for the base masterial, the melted oxide of the surface portion 8a of said base material can be also incorporated into the constitution of the insulating layer. By use of powder as in this example, there are advantages such that heat diffusion in the plate thickness direction can be reduced to promote melting, and that the surface area contacted with the reactive gas such as oxygen, etc. during heating accompanied with the reaction can be enlarged, and also the reactive gas can be incorporated sufficiently to the depth of the plate thickness direction.

For obtaining such effect, the particle size may be made preferably about 0.1 μm to 10 and some μm, more preferably about 1 to 2 μm.

In FIG. 3(a) and FIG. 3(b), by irradiating a laser beam on the metal and metal powder 8b constituting the surface portion 8a by use of the above material ii) while supplying nitrogen to the base material, an insulating layer comprising the nitride of the metal used can be obtained.

Also, by performing laser beam irradiation with the use of the inorganic material iii) as described above as the powdery material in FIG. 3(b), an insulating layer with the constitution corresponding to the kind of the inorganic material permitted to exist on the base material surface can be obtained.

As previously noted, the present invention provides a substrate having surface properties superior to those found in the prior art. For example, it has been stated that the prior art substrates did not have optimal surface properties, whereas in the present invention preferably surface characteristics are obtained. In particular, by practicing the disclosed invention, one obtains a substrate having a particularly smooth surface, which as shown in Table 1, has a surface roughness which is not more than 0.1 μm.

In this case, supplying of O$_2$ is not necessarily required. Also, by supplying an inorganic material as powder onto the substrate, the same effect as previously described can be obtained, and for that purpose, the particle size may be preferably made about 0.1 μm to 10 or more ‖ m, more preferably about 1 to 2 μm.

FIG. 3(c) shows an example, in which an insulating layer is formed while supplying, for example, powder of either one or two or more of the above i), ii) and iii) selected suitably corresponding to the constitution of the desired insulating layer to the site 2a (melted pool) where the metal surface of the base material and/or the metal powder permitted to exist already on the base material is melted by laser irradiation in the process of, for example, FIG. 3(a) and FIG. 3(b).

Two or more of these operations can be of course combined, if necessary.

The power density at the irradiated portion of laser in the method of the present invention may be suitably controlled depending on its material so that a good heated state for the material permitted to exist on the base material surface may be obtained.

For example, if the power density is too high, vaporization of the material for forming the insulating layer permitted to exist on the base material surface may be brought about, resulting in inconveniences such as generation of holes on the surface, while if the power density is too low, no sufficient temperature elevation can be obtained at the irradiated portion.

The power density on the base material surface, which may differ individually depending on the base material employed, the kind of the material for obtaining the insulating layer or amounts thereof, etc., may be preferably about $10^5$ W/cm$^2$.

The power density on the base material surface may be also controlled by controlling the moving speed of the beam spot on the base material by varying the delivery speed of the base material or the optical system.

Figure 4:
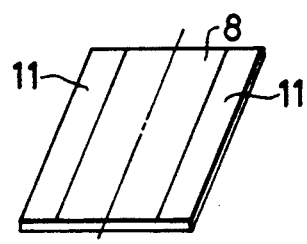
FIG. 4 and FIG. 5 illustrate the method for preventing over-heating of the substrate, FIG. 4 showing a schematic perspective illustration of the case when a disposal plate used, FIG. 5 showing a graph of one control example of power density of laser corresponding to the place of the base material.
Figure 5:
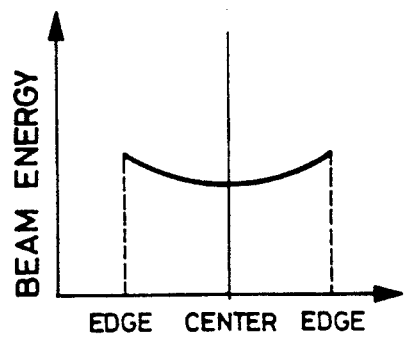

Further, when there is a fear that the bear-irradiated surface may be super-heated to obstruct formation of a good insulating layer by vaporization, etc. of the substance existing on the irradiated surface, super-heating can be prevented by selecting suitably any or a combination of the following means: for example, as shown in FIG. 4, irradiation is effected with disposal plates 11 for heat dissipation being arranged on both sides of the base material; as shown in FIG. 5, the power density at the central portion of the base material is controlled lower than the end portions of the base material; or the back surface of the base is cooled.

The practical maximum thickness of the insulating layer obtained can be determined from the relationship between the thermal properties of the base material and the material for obtaining the insulating layer and the precision of the warped amount when made into a substrate. According to the method of the present invention, it is also possible to form an insulating layer with, for example, several $\mu$m to several mm on the base material surface.

According to the method of the present invention as described above, it is possible to prepare a substrate for a heat-generating device of high reliability which can satisfy all of the various characteristics demanded for substrates for heat-generating devices for providing heat-generating devices required to repeat intermittently a heated state and non-heated state in extremely short cycles, such as ink jet recording heads or thermal heads as described above, and at low cost. In the substrate formed according to the method of the present invention, cost reductions of about 30–50% may be possible compared to, for example, the Si substrate attached with thermally oxidized film as described above.

Also, by use of the method of the present invention, since the insulating layer is formed by simple operations, etc. of which control can be easily done, such as laser beam irradiation treatment, not only can the preparation steps be simplified, but also preparation of a large area substrate can be easily done.

The substrate which can be prepared by the method of the present invention is not limited to those for an ink jet recording head or thermal head, but also those suitable for the substrate for providing various heat-generating elements for which are demanded characteristics similar to those demanded for these.

The present invention is described in more detail by referring to the following Examples.

EXAMPLE 1

On both sides of a plate material of 250×30×1 (mm) comprising Al (JIS No. 1050), disposal plates 11 of the same material were arranged as shown in FIG. 4, and also on the back surface of the plate material was closely contacted a water-cooled heat sink for promoting cooling, followed by irradiation of a laser beam by use of a laser irradiation device of the beam scanning system having a $CO_2$ laser oscillator with an output of 3 kW continuous oscillation under the conditions of a scan speed: 500 Hz, a scan width: 35 mm, a beam spot diameter: 0.5 mm (power density: $2 \times 10^4$ W/cm$^2$), a delivery speed of the plate material in the scanning direction 0.1 m/min., while feeding oxygen onto the plate material surface at a flow rate of 50 liter/min.

EXAMPLE 2

Laser beam was irradiated onto the substrate surface in the same manner as in Example 1, except for changing the delivery speed of the plate material to 3 m/min. under the state with Al powder (pure Al (JIS No. 1050); particle size 1 $\mu$m; purity 98%) placed to a thickness of about 2 $\mu$m on the same Al plate material surface as used in Example 1.

EXAMPLE 3

Laser beam was irradiated onto the substrate surface in the same manner as in Example 2 under the state with $Al_2O_3$ powder (purity 98%, particle size 1 $\mu$m) placed to a thickness of about 20 $\mu$m on the same Al plate material surface as used in Example 1.

EXAMPLE 4

Except for using nitrogen of 50 liter/min. as the feeding gas onto the plate material surface, laser beam was irradiated onto the substrate surface in the same manner as in Example 1.

EXAMPLE 5

Under the state with Al powder (the same as in Example 2) placed to a thickness of about 20 $\mu$m on the same Al plate material surface as used in Example 1, laser beam was irradiated in the same manner as in Example 4, while feeding nitrogen at 50 liter/min.

Further, the substrates formed in the respective Examples were tested and evaluated for the following items.

1) Layer thickness of the surface layer formed

Determined by observation of section with an optical microscope, namely by mirror polishing the sample surface, then etching the surface with a mixture of pure water and HF and performing structural observation of the melted layer, the heat-influenced layer and the mother material with an optical microscope.

2) Surface roughness

Measured by use of a surface roughness meter.

3) Heat resistance

After the substrate was heated at 600° C. for 24 hours, presence or absence of surface cracks by use of an optical microscope, and also presence or absence of peel-off of the melted layer (insulating layer) by observation of section were examined and evaluated.

4) Insulating property

After each substrate was cut into a predetermined size (35×37 mm), an Al electrode layer of about 8 mm×20 mm×5000 Å was formed on its insulating layer by electron beam vapor deposition and leak current was measured by applying voltages of +20 V→0 V→−20 V→0 V→+20 V between Al electrode and Al mother material.

5) Acid resistance

Evaluated after dipping in 5% $H_2SO_4$ for 24 hours.

6) Alkali resistance

Evaluated after dipping in 5% NaOH for 24 hours.

7) Heat dissipating characteristics

Heat dissipating characteristics were evaluated by use of the substrate obtained, by forming a heat-generating device on the insulating layer of the substrate and driving the device thus obtained.

Figure 6A:
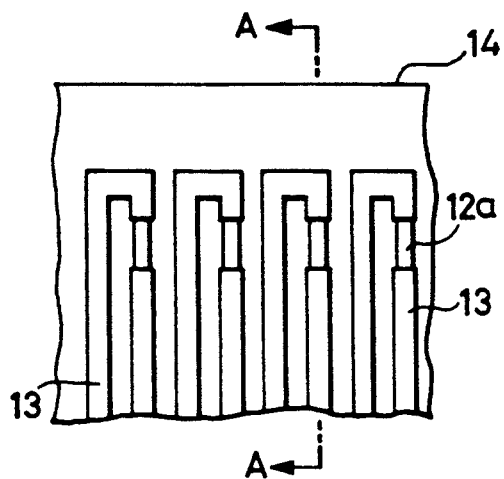
FIGS. 6(a) and 6(b) and FIGS. 7(a) and 7(b) illustrate schematically constitutions of heat-generating devices formed for evaluation of the substrates in Examples and Comparative examples, the respective Figures (a) representing plan views thereof, and the respective Figures (b) partial sectional views along the chain line shown in said plan views.
Figure 6B:
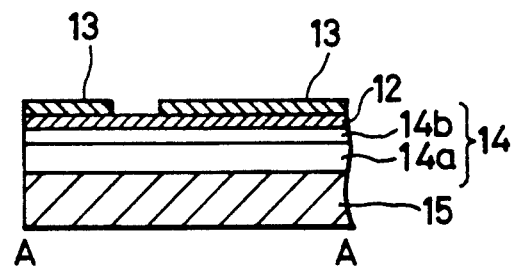

First, the substrate 14 obtained was formed into a size of 35×37 mm, and adhered onto a support 15 with a thickness of 20 mm comprising Al by use of a adhesive with good thermal conductivity, and further a heat-generating resistor ($HfB_2$) layer (12) was formed on the insulating layer 14b of the substrate by use of the sputtering technique, followed further by film formation of an electrode (Al) layer (13) by use of the electron beam vapor deposition technique thereon. Next, patterning was conducted with the use of a photoresist and a mask, and thereafter the electrode layer and the heat-generating resistance layer were subjected to etching, respectively, whereby 10 heat-generating devices 12a (160×40 μm) comprising $HfB_2$ as shown in FIGS. 6(a) and 6(b) were arranged.

Through the respective heat-generating devices 12a, current was passable by the electrode 13.

Figure 7A:
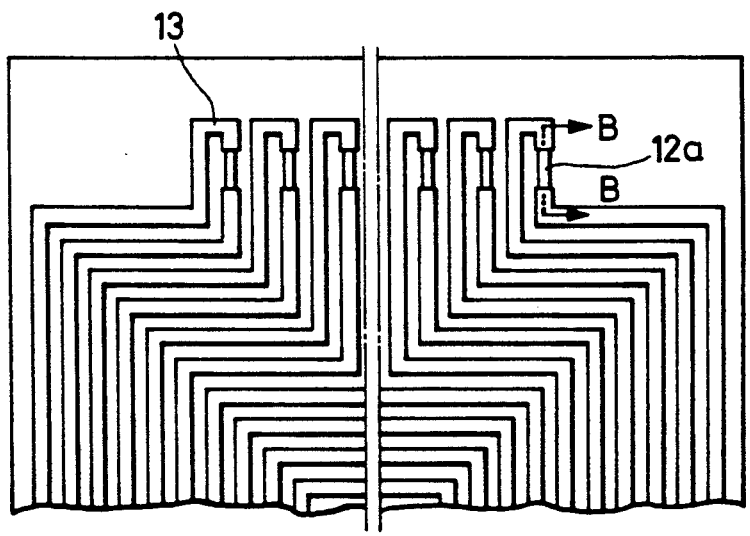
Figure 7B:
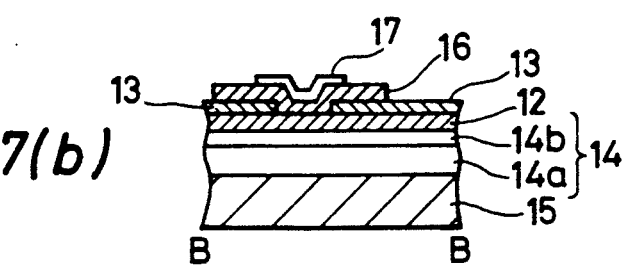

Next, an $SiO_2$ protective film 16 for prevention of penetration of ink onto the heat-generating devices 12a was formed by sputtering, and further Ta protective film 17 for prevention of cavitation breakage during bubble collapse was formed by sputtering to prepare a heat-generating device substrate as shown in FIGS. 7(a) and 7(b). In FIG. 7(a), $SiO_2$ protective film 16 and Ta protective film 17 are omitted.

Here, the respective heat-generating devices 12a were driven continuously at a driving voltage of 1.2 Vth, a pulse width of 7μ sec. and 2.5 kHz for 10 minutes, and thereafter it was tested whether there was temperature elevation around the substrate surface and the surface of the heat-generating device.

COMPARATIVE EXAMPLE 1

A Si substrate attached with a thermally oxidized film was tested and evaluated for the above items 1)-7).

The results are shown in Table 1.

When the production cost of the $SiO_2$ substrate attached with the thermally oxidized coating used in Comparative Example 1 was compared with those of the substrates obtained in the above examples, it was confirmed that, as compared with the production cost of the $SiO_2$ attached with the thermally oxidized coating, the substrates of Example 1 and Example 4 could be produced at a cost of about ½, those of Example 2 and Example 3 at about ¼ and that of Example of 5 at a cost of about ⅓.

Figure 8:
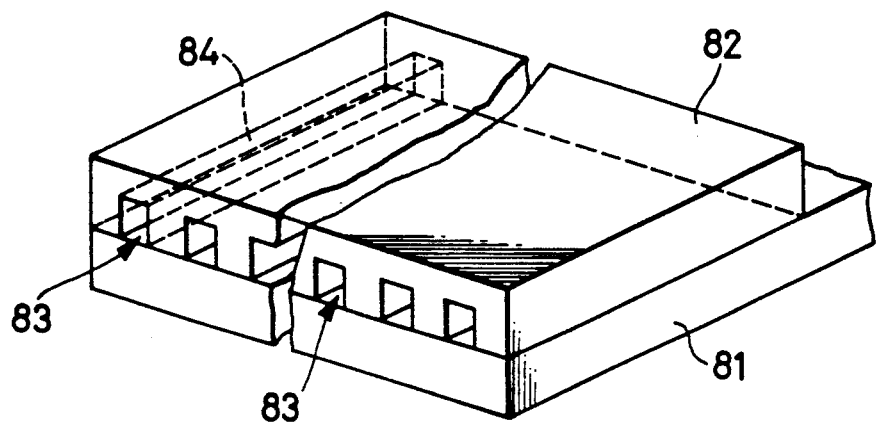
FIG. 8 is a schematic perspective view of the ink jet recording head according to the present invention.

FIG. 8 is a schematic perspective view showing an example of ink jet recording head having the substrate for heat-generating device according to the present invention.

In FIG. 8, the symbol 81 is a heat-generating substrate having the substrate for heat-generating device according to the present invention and a heat-generating device provided thereon. By bonding of said heat-generating substrate 81 to a grooved ceiling plate 82, ink discharging openings 83 and liquid pathways 84 communicated to said discharging openings 83 are formed. The above heat-generating devices are provided along liquid pathways 84.

The above ceiling plate 82 is formed with the use of, for example, a photosensitive material such as photosensitive resin, etc. Said ceiling plate 82 may be formed as one member, or alternatively with a plural number of members, by way of, for example, lamination.

Also, the above discharging opening 83 is not limited to the embodiment in which ink is discharged in the direction in substantially parallel to the direction in which ink is supplied. For example, the above discharging opening 83 may be also formed so that ink may be discharged in the direction substantially perpendicular to the direction in which ink is supplied.

Figure 9:
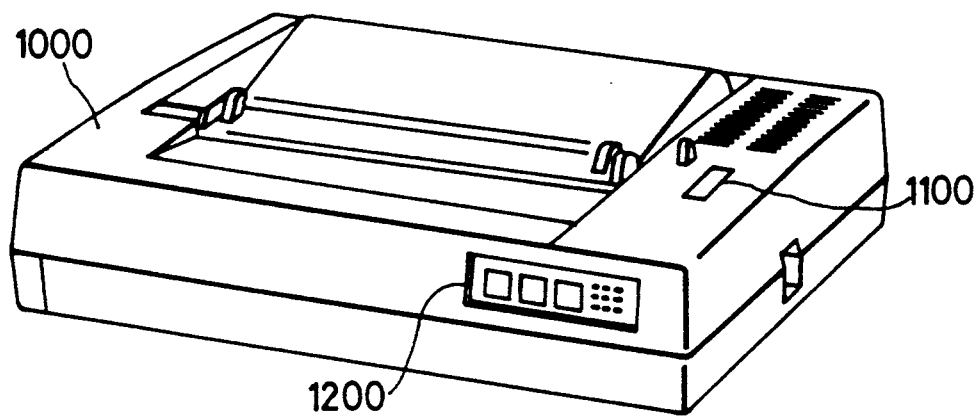
FIG. 9 is a schematic perspective view showing an example of the ink jet recording device according to the present invention.

FIG. 9 is a schematic perspective view showing an example of the ink jet recording device according to the present invention. In FIG. 9, the symbol 1000 is the main body, 1100 is a power source switch and 1200 is an operation panel.

As described in detail above, according to the method of the present invention, a substrate excellent in demanded characteristics as the substrate for a heat-generating device for an ink jet recording head or thermal head, etc. which is required to repeat intermittently the heated state and the non-heated state at extremely short cycles can be obtained at low cost and high reliability.

TABLE 1

|  | Example 1 | Example 2 | Example 3 | Example 4 | Example 5 | Comparative Example 1 |
|---|---|---|---|---|---|---|
| Insulating layer | | | | | | |
| Material | $Al_2O_3$ | $Al_2O_3$ | $Al_2O_3$ | AlN | AlN | thermally oxidized $SiO_2$ |
| Layer thickness (μm) | 2-3 | 5 | 5 | 1-2 | 2-3 | 2.75 |
| Surface roughness | Ra0.1 μm | Ra0.08 μm | Ra0.08 μm | Ra0.1 μm | Ra0.1 μm | Ra4 μm |
| Heat resistance | no abnormality | no abnormality | no abnormality | no abnormality | no abnormality | no abnormality |
| Insulating property | less than $10^{-9}$ (A) | less than $10^{-9}$ (A) | less than $10^{-9}$ (A) | less than $10^{-9}$ (A) | less than $10^{-9}$ (A) | less than $10^{-9}$ (A) |
| Acid resistance | good | good | good | good | good | good |
| Alkali resistance | good | good | good | good | good | good |
| Temperature elevation | none | none | none | none | none | none |
| Platen enlargement | possible | possible | possible | possible | possible | impossible |

Besides, according to the present invention, a substrate for heat-generating device with a large area can be produced easily.

What is claimed is:

1. A method for preparing a laminated product, the method comprising the steps of:
   irradiating high density energy onto a surface of a plate member so that the surface irradiated with said high density energy enters a molten state and solidifies to form an insulating layer having a smooth surface with a surface roughness of not more than Ra0.1 µm; and
   mounting an energy transducing device on said insulating layer.

2. A method for preparing a laminated product according to claim 1, wherein said energy transducing device is a heat-generating device having a heat-generating resistance layer and a pair of electrodes electrically connected to said heat-generating resistance layer.

3. A method for preparing a laminated product according to claim 1, wherein a material capable of forming said insulating layer by irradiation with said high density energy is provided on the surface of said plate member, said material being a powdery material having particle sizes of 0.1 µm to 10 µm.

4. A method for preparing a laminated product according to claim 3, wherein said material is at least one of the materials selected from the group consisting of Al, Ti, Mg, Al$_2$O$_3$, Si$_3$N$_4$ and SiC.

5. A method for preparing a laminated product according to claim 1, wherein said plate member is formed of a material capable of forming said insulating layer by heating the surface of said plate member through irradiation with said high density energy, said material being selected from the group consisting of Al, Ti, Mg, Al$_2$O$_3$, Si$_3$N$_4$ and SiC.

6. A method for preparing a laminated product according to claim 1, wherein irradiation of said surface by said high density energy is performed in an atmosphere containing oxygen.

7. A method for preparing a laminated product according to claim 1, wherein irradiation of said surface by said high density energy is performed in an atmosphere containing nitrogen.

8. A method for preparing a laminated product according to claim 1, wherein irradiation of said high density energy is performed at a central portion of said plate member at lower power density than at end portions thereof.

9. A method for preparing a laminated product according to claim 1, wherein said high density energy is provided by at least one of a laser beam, an electron beam, a tungsten inert gas arc and condensed light from a halogen lamp.

10. A method for preparing an ink jet recording head, the method comprising the steps of:
    irradiating high density energy onto a material provided on a surface of a base member for forming an insulating layer on said base member, wherein said material enters a molten state and solidifies to form on said base member an insulating layer having a smooth surface with a surface roughness of not more than Ra0.1 µm or less;
    mounting an electrothermal transducing device on said insulating layer, thereby forming a heat-generating substrate comprising said base member, said insulating layer and said electrothermal transducing device; and
    bonding together said heat-generating substrate and a member having a recessed portion so that said recessed portion corresponds to a heat-generating portion of said electrothermal transducing device to form a liquid pathway.

11. A method for preparing an ink jet recording head according to claim 10, wherein said electrothermal transducing device comprises a plurality of heat-generating devices for generating heat energy for discharging ink from said liquid pathway, each said heat-generating device having a heat-generating resistance layer and a pair of electrodes electrically connected to said heat-generating resistance layer, wherein said heat-generating portion is formed between said pair of electrodes.

12. A method for preparing an ink jet recording head according to claim 10, wherein said material provided on the surface of said base member for forming said insulating layer is a powdery material having particle sizes of 0.1 µm to 10 µm.

13. A method for preparing an ink jet recording head according to claim 12, wherein said material is at least one of the materials selected from the group consisting of Al, Ti, Mg, Al$_2$O$_3$, Si$_3$N$_4$ and SiC.

14. A method for preparing an ink jet recording head according to claim 10, wherein irradiation by said high density energy is performed in an atmosphere containing oxygen.

15. A method for preparing an ink jet recording head according to claim 10, wherein irradiation by said high density energy is performed in an atmosphere containing nitrogen.

16. A method for preparing an ink jet recording head according to claim 10, further comprising the step of forming a protective layer on said electrothermal transducing device after said step of mounting.

17. A method for preparing an ink jet recording head, the method comprising the steps of:
    irradiating high density energy onto a base material so that a surface portion of said base material enters a molten state and solidifies to form an insulating layer having a smooth surface with a surface roughness of not more than Ra0.1 µm;
    mounting an electrothermal transducing device on said insulating layer, thereby forming a heat-generating substrate comprising said base material, said insulating layer and said electrothermal transducing device; and
    bonding together said heat-generating substrate and a member having a recessed portion so that said recessed portion corresponds to a heat-generating portion of said electrothermal transducing device to form a liquid pathway.

18. A method for preparing an ink jet recording head according to claim 17, wherein said electrothermal transducing device comprises a plurality of heat-generating devices for generating heat energy for discharging ink from said liquid pathway, each said heat-generating device having a heat-generating resistance layer and a pair of electrodes electrically connected to said heat-generating resistance layer, wherein said heat-generating portion is formed between said pair of electrodes.

19. A method for preparing an ink jet recording head according to claim 17, wherein said surface portion of said base material is formed of at least one of the materials selected from the group consisting of Al, Ti, Mg, Al$_2$O$_3$, Si$_3$N$_4$ and SiC.

20. A method for preparing an ink jet recording head according to claim 17, wherein irradiation by said high density energy is performed in an atmosphere containing oxygen.

21. A method for preparing an ink jet recording head according to claim 17, wherein irradiation by said high density energy is performed in an atmosphere containing nitrogen.

22. A method for preparing an ink jet recording head according to claim 17, further comprising the step of forming a protective layer on said electrothermal transducing device after said mounting step.

23. A method for preparing a laminated product, the method comprising the steps of:
 irradiating a surface of a plate member with a laser beam having a power density on the order of 10$^5$ W/cm$^2$, thereby forming a smooth insulating area with a surface roughness of not more than Ra0.1 μm on the surface of said plate member; and
 mounting an energy transducing device on said insulating area.

24. A method for preparing an ink jet recording head, the method comprising the steps of:
 irradiating a material provided on a base member for forming an insulating layer with a laser beam having a power density on the order of 10$^5$ W/cm$^2$, thereby forming an insulating layer having a smooth surface with a surface roughness of not more than Ra0.1 μm on said base member;
 mounting an electrothermal transducing device on said insulating layer, thereby forming a heat-generating substrate comprising said base member, said insulating layer and said electrothermal transducing device; and
 bonding together said heat-generating substrate and a member having a recessed portion so that said recessed portion corresponds to a heat-generating portion of said electrothermal transducing device to form a liquid pathway.

25. A method for preparing an ink jet recording head, the method comprising the steps of:
 irradiating a surface portion of a base material with a laser beam having a power density on the order of 10$^5$ W/cm$^2$, thereby forming on the surface portion of said base material an insulating layer having a smooth surface with a surface roughness of not more than Ra0.1 μm;
 mounting an electrothermal transducing device on said insulating layer, thereby forming a heat-generating substrate comprising said base material, said insulating layer and said electrothermal transducing device; and
 bonding together said heat-generating substrate and a member having a recessed portion so that said recessed portion corresponds to the heat-generating portion of said electrothermal transducing device to form a liquid pathway.

* * * * *

UNITED STATES PATENT AND TRADEMARK OFFICE
CERTIFICATE OF CORRECTION

PATENT NO.  : 5,287,622
DATED       : February 22, 1994
INVENTOR(S) : HARUHIKO TERAI It is certified that error appears in the above-indentified patent and that said Letters Patent is hereby corrected as shown below:

COLUMN 1

Line 48, "metallic" should read --metallic base--.
    Line 53, "intermittently" should be deleted.
    Line 59, "heat generating" should read --heat-generating--.
    Line 62, "desired" should read --a desired--.

COLUMN 2

Line 1, "ability" should read --ability;--.
    Line 38, "number" should read --number of--.
    Line 40, "Organic" should read --organic--.
    Line 64, "characteristic" should read --characteristics--.

COLUMN 3

Line 7, "etc," should read --etc.--.
    Line 66, "plate" should read --plate is--.

COLUMN 4

Line 21, "as" should read --a--.
    Line 23, "preferably" should read --preferable--.
    Line 37, "eating" should read --heating--.

COLUMN 5

Line 22, "using" should read --using a--.

UNITED STATES PATENT AND TRADEMARK OFFICE
CERTIFICATE OF CORRECTION

PATENT NO. : 5,287,622
DATED : February 22, 1994
INVENTOR(S) : HARUHIKO TERAI

It is certified that error appears in the above-indentified patent and that said Letters Patent is hereby corrected as shown below:

COLUMN 6

Line 4, "of as metal of which oxide" should read --is a metal of the oxide of which --.
    Line 22, "and some" should read --or more--.
    Line 40, "preferably" should read --preferable--.
    Line 51, "|| m," should read --µm,--.

COLUMN 7

Line 17, "bear-irradiated" should read --beam-irradiated--.

COLUMN 9

Line 15, "a" should read --an--.

COLUMN 10

Line 9, "of" (second occurrence) should be deleted.
    Line 12, "of" should read --of an--.
    Line 13, "for" should read --for a--.
    Line 16, "for" should read --for a--.

UNITED STATES PATENT AND TRADEMARK OFFICE
CERTIFICATE OF CORRECTION

PATENT NO. : 5,287,622

DATED : February 22, 1994

INVENTOR(S) : HARUHIKO TERAI

Page 3 of 3

It is certified that error appears in the above-indentified patent and that said Letters Patent is hereby corrected as shown below:

<u>COLUMN 10</u>

Line 31, "in" (first occurrence) should be deleted.

Signed and Sealed this

Twenty-third Day of August, 1994

Attest:

BRUCE LEHMAN

Attesting Officer

Commissioner of Patents and Trademarks